Feb. 11, 1930.  H. L. JAVAL  1,747,078
COACHWORK OF AUTOMOBILE VEHICLES
Filed Feb. 6, 1928  5 Sheets-Sheet 1

Inventor
H. L. Javal
by Wilkinson & Ginota
Attorneys.

Feb. 11, 1930.  H. L. JAVAL  1,747,078
COACHWORK OF AUTOMOBILE VEHICLES
Filed Feb. 6, 1928   5 Sheets-Sheet 4

Inventor
H. L. Javal
by Wilkinson & Ginsta
Attorneys.

Feb. 11, 1930.                    H. L. JAVAL                    1,747,078
                       COACHWORK OF AUTOMOBILE VEHICLES
                            Filed Feb. 6, 1928          5 Sheets-Sheet 5

Inventor
H. L. Javal
by Wilkinson & Huesta
   Attorneys.

Patented Feb. 11, 1930

1,747,078

UNITED STATES PATENT OFFICE

HENRI LEOPOLD JAVAL, OF PARIS, FRANCE

COACHWORK OF AUTOMOBILE VEHICLES

Application filed February 6, 1928, Serial No. 252,365, and in France February 14, 1927.

The present invention relates to certain improvements in the coachwork of motor cars, which enable the motor cars to which they are applied to be completely and instantaneously converted into open, closed, coupé and limousine form or the like. The term coupé is used in its European acceptation to designate a body wherein the two front seats are completely exposed and divided off from the rear seats by a transversely extending partition in which a window is formed.

One of the essential characteristics of the invention lies in the fact that, on the one hand, the operations and parts utilized in the various transformations are very simple, the vehicle always remaining perfectly closed and the normal movement of the doors and windows being in no wise affected, while, on the other hand, this result is obtained by means of a device of such nature that no shocks are transmitted from the top to the body and vice versa by the vehicle transforming members, so that neither slack nor wear sets in in these members nor in the coachwork to which they are applied.

The invention essentially consists in the use for the purpose of transforming the coachwork of vehicles, of lateral, vertical, and detachable panels, which are flexible and normally under tension, and are located intermediate the front and rear doors, while they are secured at their lower ends to the edge of the body of the coachwork and, at their upper ends, to the longitudinal bearers of the top, said panels being applied in combination with the body of the coachwork and the top and with windows sliding in the front and rear door and in the partition separating the front seats from the back.

According to a form of construction, the panel comprises a lower and an upper frame member connected together by a sheet of leather or other flexible material, which preferably matches the leather or other material with which the top or the body of the coachwork is covered over, said lower and upper frame members being respectively attached to the upper longitudinal bearer of the body and the longitudinal bearer of the hood.

According to a characteristic feature of the invention, the frame members of the panel are pivotally mounted near their respective ends at points facing the pivot points of the corresponding door, so as to provide two end portions which, as far as the lower frame member is concerned, are secured to the corresponding door with which they can rotate so that the panel shall be completely connected to the windows, such connection being obtained by the fact that the window guides of the doors engage in a U formed over the whole height of each of the two side edges of the panel. In this manner, a totally enclosed vehicle is obtained.

The two pivot end portions of the upper frame member are constrained to pivot with the corresponding ends of the lower frame member by any suitable means, so that all the faces of the panel shall always remain plane and uniform.

According to an alternative, particularly applicable when the pivot axis of the door is sufficiently off-set with respect to the plane of the flexible panel, the above-mentioned pivot axes are suppressed, the fixed edge of the flexible panel then falling into line with the window frame on the door being closed. The panel is then adjusted relative to the window frame either through the medium of the fixed U-iron carried by the flexible panel and into which fits the edge of the frame, or through the medium of a groove made in the corresponding vertical edge of the frame itself and in which a bead, formed on the corresponding edge of the flexible panel, engages.

According to another characteristic of the invention, the frame members of each panel are provided with another pivot axis facing the transverse window of the body of the coachwork, such pivot axis enabling the panel to be connected through the pivoting of the front portion of the frame members, to the transverse window, just as they had previously been connected to the windows of the front doors, whereby it is possible to obtain a coupé or limousine body, with the front seats completely separated from the back seats.

According to the invention, the upper frame member is furthermore provided with a longitudinal pivot axis which enables the panel to pivot transversely with respect to the longitudinal bearer of the top whereby the hood can be folded without the upper frame member having been previously taken down.

According to the invention, means are finally provided for fixing the upper frame member of each panel when it is desired to provide an open body having at the rear thereof a transverse windscreen and side windscreens which are then respectively constituted by the transverse window and by the windows of the rear doors.

According to a form of construction, these means consist in a supporting member maintained at the requisite height by a buttress, the lower end of which is fixed to the separating partition while said buttress carries said supporting member at one of its ends, the upper frame member of the panel being then fixed to said supporting member, in like manner as it had previously been fixed for the coupé body, on the longitudinal bearer and the transverse partition of the hood.

According to another form of construction, the aforesaid buttress is constituted by a telescopic tube fixed at its lower end to the separating partition and which can easily be brought into a withdrawn position, after the windows have been lowered and the supporting member removed, without it being necessary to dismount it, any suitable means being employed to lock said telescopic tube in its raised position.

Other characteristics and peculiarities of the invention will become apparent from the description about to be made thereof in conjunction with the accompanying drawings, in which:

Fig. 12ª shows an alternative form of construction.

In all the figures of the drawings, the body of the coachwork has been comprehensively designated by the reference numeral 1 and the top, with which said coachwork is provided, by the reference numeral 2. The body of the coachwork is provided on its upper portion and on either side with a longitudinal bearer 3 of any desired cross-section. Similarly, the top 2 includes two side bearers 4 which lie horizontally when the top is in the position illustrated in Figs. 15 and 16. Such top 2 may be of any type whatsoever. The coachwork is provided on either side, in the usual manner, with a front door 5 and a rear door 6 which swing open by respectively pivoting about the hinges or pivot axes 7 and 8. Within these doors are located windows 9 and 10 which can be raised by any suitable means and which are guided in their displacement by guides 11 and 12 which are adapted, in the known manner, to close down over the upper opening in the door when the window is lowered and which are on the contrary brought into a vertical position when the window is being raised, by suitably pivoting about pivot axes such as 13 Fig. 1.

The invention essentially consists in a flexible connecting panel comprising, according to the form of embodiment illustrated in the drawings, a lower and an upper frame member each constituted by a suitable metal bar 14 or 15, made of aluminium for example, and which, in the case illustrated in the drawings comprise pivot axes 16 and 17 disposed opposite the pivot axes 7 and 8 of the corresponding doors. These two lower and upper frame members are connected together by a panel of leather or other flexible material, such as 32, which preferably matches the leather or other material with which the top or coachwork to which the device is to be applied is covered over. The lower and upper parts of this leather panel completely cover the corresponding frame members 14 and 15 so as to provide a uniform outward appearance. Moreover, with this end in view, a leather tab 33 (Fig. 2) may be provided on the lower portion in order to conceal completely the lower frame member 14.

Figures 1, 2, 5, 6, 7, 8:
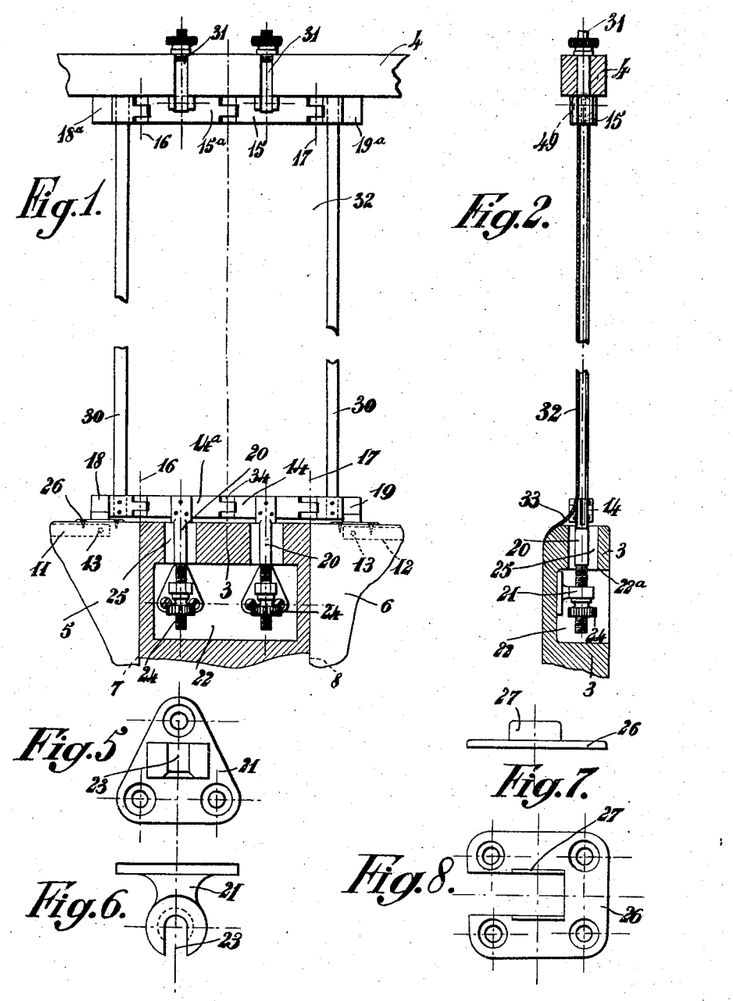
Fig. 1 is an elevational view of a joining panel in conformance with the invention.
Fig. 2 is a sectional end elevation thereof.
Figs. 5 and 6 are detail views illustrating the device for fixing the panel to the longitudinal bearer of the body of the coachwork.
Figs. 7 and 8 are detail views of a member enabling the ends of the lower frame member of the panel to be fixed to the corresponding doors.
Figures 3, 4, 9:
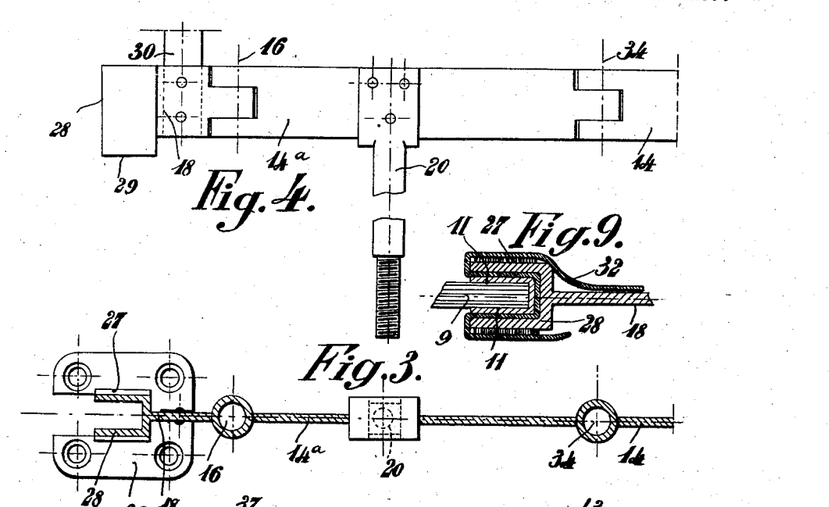
Fig. 3 is an enlarged plan view of one of the ends of the panel illustrated in Fig. 1.
Fig. 4 shows an alternative form of construction of the lower frame member of this panel.
Fig. 9 is a sectional plan view showing the relative positions of the panel ends and of the window guides of the corresponding doors.
Figure 10:
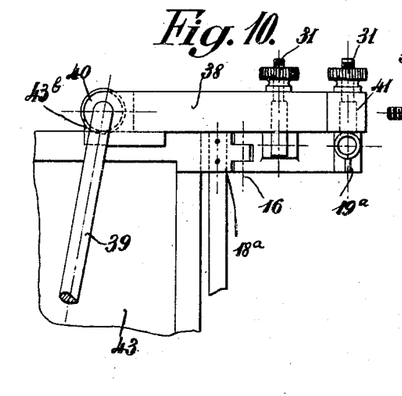
Figs. 10, 11 and 12 are enlarged detail views in longitudinal elevation, end elevation and plan respectively of the device for fixing the upper frame member of the panel in the case of an open body.
Figure 11:
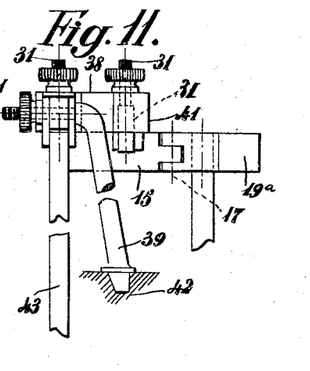
Figure 12:
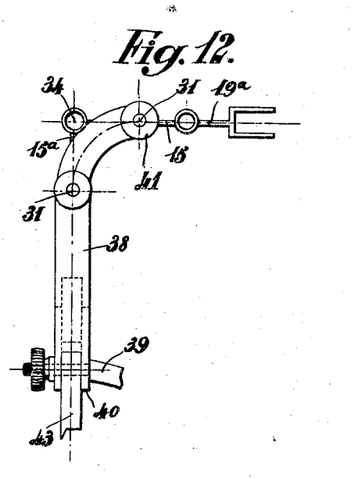
Figure 12A:
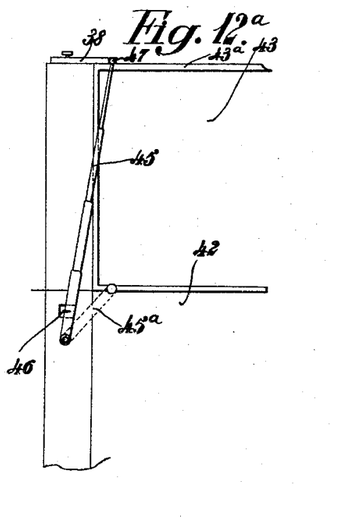
Figure 13:
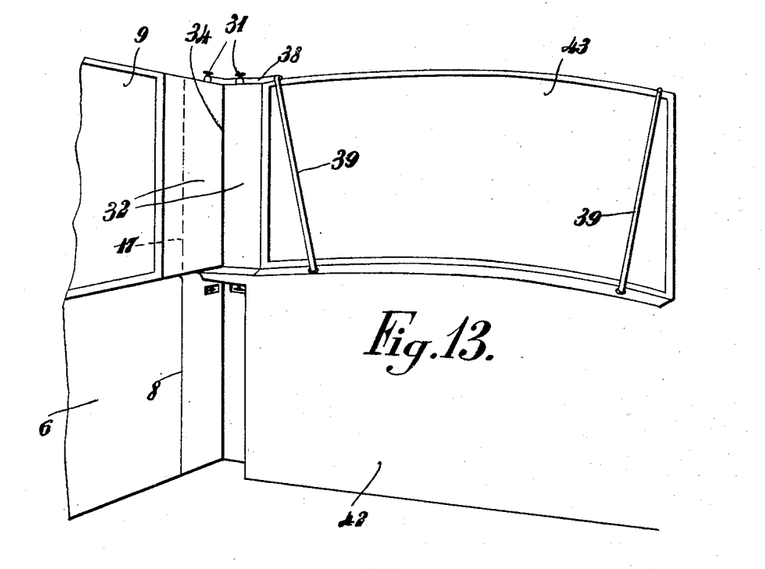
Fig. 13 illustrates the rear transverse and side windscreen device of a car having an open body in conformance with the invention.

The central portion of the frame member 14 bounded by the two pivotally mounted end portions 18 and 19, can be fixed to the longitudinal bearer 3 of the body by any suitable means, such for example as studs 20 integral with the frame member 14 and fixed to the longitudinal bearer 3 through the medium of supporting members or brackets 21, one of which is illustrated in detail in Figs. 5 and 6; these brackets 21 are mounted in a recess 22 of the longitudinal bearer 3 and have an open notch 23 in which are engaged the ends of the corresponding studs 20 which also pass through suitable openings 25 let into the upper portion of the longitudinal bearer 3. This arrangement enables the stud 20 and, consequently, the frame member 14, to be dismounted instantaneously without it being necessary to unscrew completely the fixing nuts 24. These fixing means could, moreover, be replaced by any other means such for example as ordinary bolts the nuts of which would be adapted to bear against the upper face $22^a$ of the recess 22 of the longitudinal bearer 3. The ends 18 and 19 of the frame member 14, located opposite the front and rear doors 5 and 6 of the body of the car, are connected to these doors so as to rotate therewith. This connection may be obtained by fitting a fixing plate 26, illustrated in detail in Figs. 7 and 8, on the upper portion of the corresponding door, as illustrated in Fig. 1, such fixing plate having two vertical wing portions 27 which encase the U 28 finishing off the end parts 18 and 19 of the frame member 14. With this arrangement, said parts 18 and 19 will be constrained to move with the doors 5 and 6 respectively. The same result might likewise be achieved by providing the two wings of the U-irons 28, as illustrated in Fig. 4, with extensions 29 engaging in corresponding recesses of the doors 5 or 6. Any other arrangement might moreover be adopted, the essential proviso being that while the central portion of the frame member must remain stationary relative to the longitudinal bearer 3, the two portions 18 and 19 of said frame member 14 must on the contrary follow every movement of the doors 5 and 6. Connecting members such as a leaf spring 30, crossed wires or any other equivalent means may be spanned between the parts 18 and $18^a$, and 19 and $19^a$ in order to move the corresponding end parts $18^a$ and $19^a$ of the upper frame member 15. Hence, the parts $18^a$ and $19^a$ will move concomitantly with the corresponding parts 18 and 19, while the central portion of said frame member 15 will remain stationary on account of the fact that it is fixed to the longitudinal bearer 4 of the top 2 by means of bolts 31.

According to an alternative form of construction, applicable when the pivot axis of the door is sufficiently offset with respect to the plane of the panel 32 (on the outside of which it is located), the pivot axes 16 and 17 can be suppressed, the end parts 18 and 19, and $18^a$ and $19^a$ of the frame members 14 and 15 being then connected to the central portions $14^a$ and $15^a$ of said frame members. In particular, the U-iron 28 (Fig. 3) is stationary and does not move with the window frame. But this latter's edge owing to the offset position of the pivot axis of the door, fits into said U-iron on the door being closed. On opening this latter, said edge disengages itself therefrom.

Moreover, in accordance with the invention, the position of the U-iron may be inverted. This has been illustrated in Fig. 18 in which the flexible panel 32 ends in a bead $32^a$ formed over the whole height of the corresponding edge. Such bead may be obtained for example by wrapping the leather about a flexible cable $32^b$. In this case, the window guide of frame 11 is provided on its corresponding outer edge with a groove $11^a$ which is of circular or any other form and in which the bead $32^a$ fits on the door closing. More precisely, when this door moves, it is the frame 11 which fits about or stands clear of the bead. In order to obtain a better fit, a leather tab $32^c$ may be provided which, in the closure position, covers up the joint between the bead $32^a$ and the window frame 11.

Figure 15:
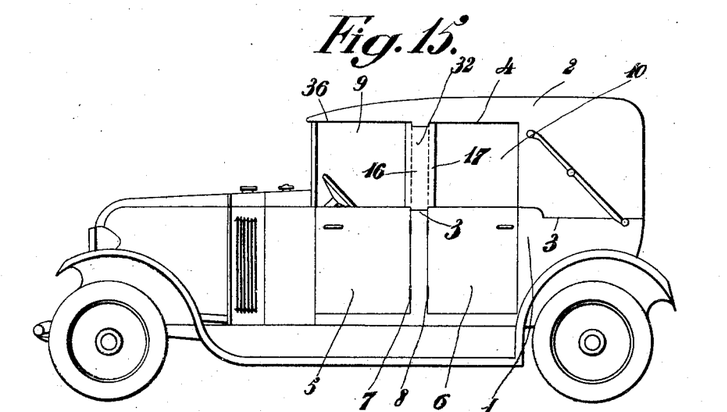
Fig. 15 is a view of a car with a closed body.

In order to obtain a closed body with the device in conformance with the invention, it is only necessary to apply said device as it has just been described and as it is illustrated in Figs. 1 and 2. For, when the window guide 11 of the front door 5 is raised vertically, the two doors being closed, said window guide fits into the U formed by the leather panel 32 (see Fig. 9) the ends of which mould themselves exactly to the shape of the U 28 of the lower and upper end portions 18 and $18^a$, so that the leather panel assumes this U shape over the whole height thereof. The whole length of the window frame 11 will be thus sheathed in the U and as the window 9 will itself be sheathed in said window frame, the window and the leather panel will thus fit together without a break. On opening the door, the portion 18 will pivot with said door, and consequently the portion $18^a$ likewise. The leather will bend of its own accord and as the parts 18 and $18^a$ will be displaced to equal extents, the leather panel will always have plane and uniform faces. All the remarks which have thus been made in connection with the front door apply likewise to the rear door. Fig. 15 shows clearly a vehicle having a closed body obtained by means of the device in conformance with the invention.

Figure 16:
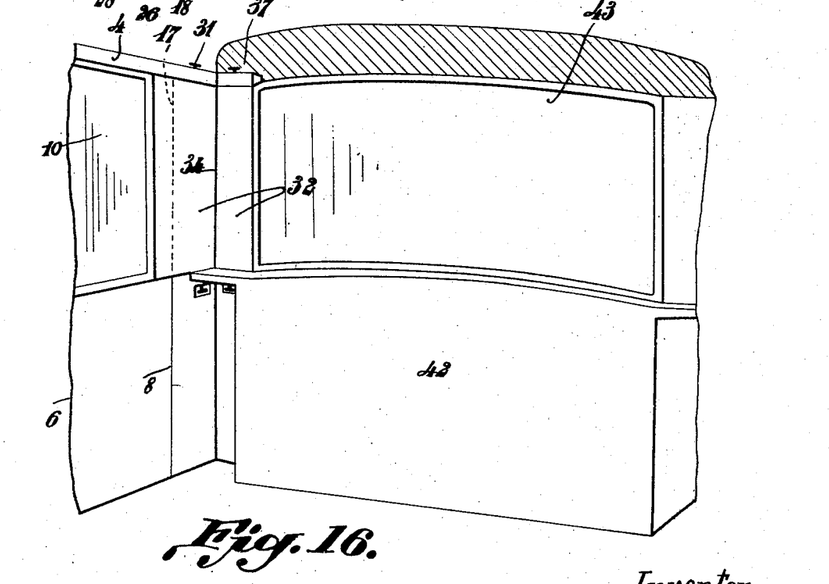
Fig. 16 shows the device according to the invention, as seen from the back seats, when applied to said coupé or limousine body.
Figure 17:
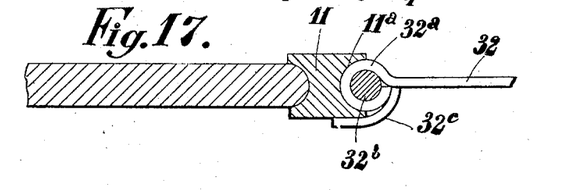
Fig. 17 illustrates an alternative form of construction.

When a coupé or limousine body is desired, as illustrated in Fig. 16, i. e. a vehicle in which the front seats are completely separated from the rear ones, it is necessary to resort to a third pivot axis 34 situate in the middle of the frame members 14 and 15, as well as the above specified pivot axes 16 and 17. This central pivotal connection 34 is situate facing the transverse partition 42 of the hood 2. In the case of a coupé or limousine body; the pivotal connection 17 and the rear end portions 19 and 19ª serve exactly the same purpose as they did in the case of the closed body, that is to say they enable the leather panel 32 to be connected to the window of the rear door as described above. On the other hand, the leather panel 32 is no longer connected at its front end with the window of the corresponding door; on the contrary, as will be seen from Figs. 16 and 17, the front portions 14ª and 15ª are set at right angles to the rear portions, after having disengaged the studs 20 and 31 by means of which said front portions 14ª and 15ª of the frame members 14 and 15 are fixed in position, the front end portions 18 and 18ª then coming into position opposite the window 43 which is framed by the transverse partition 42 and which can be raised by any suitable means. The window guide, or in default thereof, the frame of said window 43 is brought into its raised position and then fits into the U formed by the leather panel at its corresponding end, just as the window guide of the front door did previously. The inner transverse window 43 will be thus joined at each end to the corresponding leather panel which naturally will have bent along the whole length of the pivot axis 34, and it will be readily understood that the two panels (on the right and left of the vehicle) having been brought into the above specified position, the front seats of the vehicle will be completely separated from the back ones, so that the desired aim will be secured. The front portion 15ª of the upper panel frame member 15 can be secured in the requisite position by fixing it with respect to the longitudinal bearer 4 by any suitable means by a member 37 connected to the longitudinal bearer 4.

According to the invention, the upper frame member 15 of each panel has a longitudinal pivot axis 49 which enables the panel unit to be pivoted relative to the longitudinal bearer 4 of the top after the lower frame member has been dismounted. The top can consequently be folded without it first being necessary to take down the upper frame member, i. e. to dismantle the panel completely.

In order to obtain, according to the invention, an open body the rear seats of which are provided with transverse end side windscreens, it is only necessary to apply the device according to the invention in the same manner as it was applied to the coupé or limousine body. However, since the top 2 has been completely removed, means must be provided for fixing the upper frame member 15 of the panels, since said frame member can no longer be secured to the longitudinal bearers 4. In Figs. 10 to 13, a form of embodiment of such means has been illustrated. According to this form of embodiment, the upper frame member 15 is fixed to a bent supporting member 38 held in the requisite position by a buttress 39, the lower end of which is encastered in the transverse partition 42; this buttress supports one of the ends 40 of the long leg of the member 38, which leg is located in a plumb-line with the transverse partition 42 and parallel to this latter. The rear portion of the frame member 15, which is located facing the longitudinal bearer 3, is fixed to the other end 41 of the member 38, the corresponding end portion 19ª then receiving the window guide of the rear side door just as in the previously described arrangements. The side windscreen which, in the case in point, is constituted by the window of the door will be thus rigidly held in position.

Figure 14:
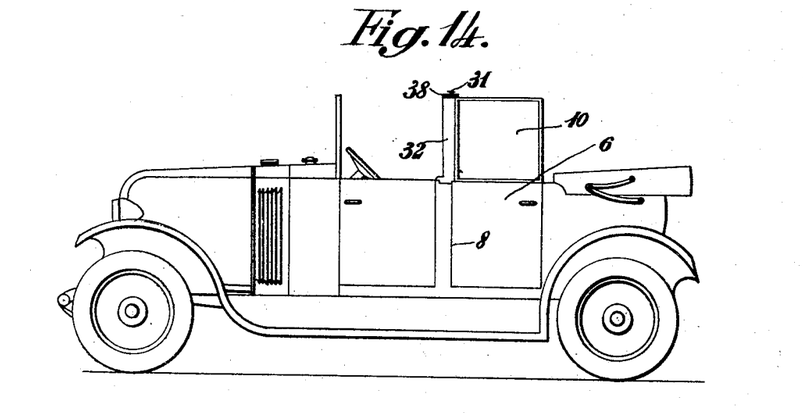
Fig. 14 is a complete longitudinal elevation of said open body.

Moreover, the front portion 15ª of the frame member 15 which is positioned opposite the transverse partition 42 as in the case of the coupé body, i. e. parallel to the long leg of the member 38, may be fixed to said leg. The same studs 31 will be used to fix in position the two portions of the frame member 15 as those previously employed for fixing the selfsame frame member to the longitudinal bearer 4 of the top 2. As in the case of the coupé limousine body, the guides of the transverse window 43 will fit into the U 28 so that said window is thereby rigidly held in position. As illustrated, the buttress 39 might be even made to support the frame 43ª of said window. The end of said buttress would be then passed through a boss 43ᵇ provided on the frame. With this arrangement, an open body with rear windscreen and side windscreens, as illustrated in Fig. 14, would be obtained. Obviously, this arrangement which has been described for one side of the vehicle, is reproduced in an identical manner on the other side.

It is moreover self-evident that the invention has only been described and represented here in a purely explanatory but by no means limitative manner, and that it could be subjected to various modifications of detail, without departing from the spirit thereof. Thus the panel 32 which, in the case described, is supposed to be made of leather or other flexible material, might on the contrary be made of stiff material connected to the fixing frame members by a flexible device. In this case, it will be necessary to provide pivot points not only in the upper and lower frame members, but all along the panel itself.

I claim:

1. In a coachwork forming device for an automobile vehicle of the kind comprising a removable top, a body, longitudinal bearers to said top and body, and front and rear doors, the combination of upper and lower frame members, means for securing said lower frame members to the longitudinal bearers of said body, means for maintaining said upper frame members above said lower frame members in spaced relation thereto, panels of flexible material stretched between and passed over and under said upper and lower frame members respectively, sliding windows to said doors, uprights forming guides for said windows, and means for shaping the vertical edges of said panels to engage with said uprights over the whole length thereof.

2. In a coachwork forming device for an automobile vehicle of the kind comprising a foldable top, a body, longitudinal bearers to said top and body, and front and rear doors, the combination of upper and lower frame members, means for securing said upper and lower frame members to the longitudinal bearers of said top and body respectively, panels of flexible material stretched between and covering over said upper and lower frame members, sliding windows to said doors, pivotally mounted uprights forming guides for said windows, and means for shaping the vertical edges of said panels to engage with said uprights over the whole length thereof.

3. In a device for transforming the coachwork of an automobile vehicle of the kind comprising a foldable top, a body, longitudinal bearers to said top and body, and front and rear doors, the combination of upper and lower frame members comprising pivotally connected sections, means for securing the rear sections of said lower frame members to the longitudinal bearers of said body, means for maintaining the corresponding rear sections of said upper frame members above said lower rear sections and in spaced relation thereto, panels of flexible material stretched between and covering over said upper and lower frame members, pivotally mounted uprights for forming guides to said windows, means for shaping the vertical edges of said panels to engage with said uprights, and a transversely disposed window with which by the vertical edges of the front portions of said panels are adapted to join up, the front sections of said upper and lower frame members being for this purpose swung at right angles to the corresponding rear sections thereof.

4. In a device for transforming the coachwork of an automobile vehicle of the kind comprising a foldable top, a body, longitudinal bearers to said top and body, and front and rear doors, the combination of upper and lower frame members comprising pivotally connected sections, means for securing the rear sections of said upper and lower frame members to the longitudinal bearers of said top and body respectively, panels of flexible material stretched between and covering over said upper and lower frame members, pivotally mounted uprights for forming guides to said windows, means for shaping the vertical edges of said panels to engage with said uprights, means for fixing the front sections of said upper and lower frame members at right angles to the rear sections thereof, and a transversely disposed window adapted to be maintained in position by the vertical edges of the front portions of said panels.

5. In a device for obtaining a closed coupé, limousine and open body for an automobile vehicle of the kind comprising a foldable top, a body, longitudinal bearers to said top and body, and front and rear doors, the combination of upper and lower frame members disposed in spaced relation to each other and comprising pivotally connected sections, means for securing the rear sections of said lower frame members to the longitudinal bearers of said body, panels of flexible material stretched between and covering over said upper and lower frame members, pivotally mounted uprights for forming guides to said windows, means for shaping the vertical edges of said panels to engage with said uprights, a transversely disposed window adapted to be framed by the vertical edges of the front portions of said panels, the front sections of said upper and lower frame members being for this purpose swung at right angles to the corresponding rear sections thereof, a transverse partition, and buttresses with ends respectively supporting the front sections of said upper frame members and encastered in said partition, when the hood is completely removed to obtain an open body.

6. In a coachwork forming device for an automobile vehicle of the kind comprising a foldable top, a body, longitudinal bearers to said top and body, and front and rear doors, the combination of upper and lower frame members, means for securing said upper and lower frame members to the longitudinal bearers of said top and body respectively, panels of flexible material stretched between and covering over said upper and lower frame members, sliding windows to said doors, pivotally mounted uprights forming guides for said windows, channeled ends to said upper and lower frame members for receiving the ends of the vertical edges of said panels and moulding said edges to form a groove adapted to receive said uprights, said channeled ends being pivotally connected to the central portions of said frame members opposite the hinges of said doors, and means for fixing the pivotally connected end portions of said lower frame members to the front and rear doors respectively.

7. In a device for transforming the coachwork of an automobile vehicle of the kind comprising a removable top, a body, longitudinal bearers to said top and body, and front and rear doors, the combination of upper and lower frame members comprising pivotally connected sections, means for securing the rear sections of said upper and lower frame members to the longitudinal bearers of said top and body respectively, panels of flexible material stretched between and covering over said upper and lower frame members, pivotally mounted uprights for forming guides to said windows, channeled ends to said upper and lower frame members for receiving the ends of the vertical edges of said panels and moulding said edges to form channels adapted to receive said uprights, said channeled ends being pivotally connected to the central portion of said frame member opposite the hinges of said doors, means for fixing the pivotally connected end portions of said lower frame members to the front and rear doors respectively, and a transverse window, adapted to be held in the channeled vertical edges of the front portions of said panels, the front sections of the said upper and lower frame members being for this purpose swung at right angles to the rear sections thereof.

8. In a coachwork forming device for an automobile vehicle of the kind comprising a removable hood, a body, longitudinal bearers to said hood and body, and front and rear doors, the combination of upper and lower frame members, means for securing said upper and lower frame members to the longitudinal bearers of said hood and body respectively, panels of flexible material stretched between and covering over said upper and lower frame members, sliding windows to said doors, pivotally mounted uprights forming guides for said windows, and flexible cables about which the vertical edges of said panels are curled, said uprights being grooved to fit about said curled vertical edges.

HENRI LEOPOLD JAVAL.